United States Patent
Ono et al.

(10) Patent No.: US 9,207,453 B2
(45) Date of Patent: Dec. 8, 2015

(54) MIRROR ROTATING APPARATUS

(71) Applicant: Nidec Corporation, Kyoto (JP)

(72) Inventors: Kazuhiro Ono, Kyoto (JP); Takahiro Suginohara, Kyoto (JP); Ryogo Mochizuki, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/490,695

(22) Filed: Sep. 19, 2014

(65) Prior Publication Data

US 2015/0092256 A1 Apr. 2, 2015

(30) Foreign Application Priority Data

Sep. 27, 2013 (JP) ................................. 2013-200981

(51) Int. Cl.
*G02B 26/08* (2006.01)
*G02B 26/12* (2006.01)
*F16D 65/00* (2006.01)

(52) U.S. Cl.
CPC ............ *G02B 26/12* (2013.01); *F16D 65/0006* (2013.01); *G02B 26/0816* (2013.01); *G02B 26/121* (2013.01)

(58) Field of Classification Search
CPC ........ G02B 5/09; G02B 26/12; G02B 26/121; G02B 26/123; G02B 26/129; F16F 15/363
USPC ..................... 359/216.1–219.1, 200.1, 198.1; 310/267
See application file for complete search history.

(56) References Cited

U.S. PATENT DOCUMENTS

| | | | |
|---|---|---|---|
| 4,432,598 A | 2/1984 | Akanabe et al. | |
| 5,187,606 A | 2/1993 | Kondo et al. | |
| 5,245,234 A | 9/1993 | Okada et al. | |
| 5,903,300 A * | 5/1999 | Suzuki ................ | G02B 26/121 359/855 |
| 6,242,826 B1 * | 6/2001 | Saito ..................... | F16F 15/363 310/267 |
| 2007/0146852 A1 | 6/2007 | Itami | |

FOREIGN PATENT DOCUMENTS

| JP | 63-173017 A | 7/1988 |
|---|---|---|
| JP | 05-049225 A | 2/1993 |
| JP | 9-126936 A | 5/1997 |
| JP | 10-325937 A | 12/1998 |
| JP | 2002-218721 A | 8/2002 |

* cited by examiner

*Primary Examiner* — Euncha Cherry
(74) *Attorney, Agent, or Firm* — Keating & Bennett, LLP

(57) ABSTRACT

A mirror rotating apparatus includes a stationary portion and a rotating portion. The stationary portion includes a detection sensor configured to detect rotation of the rotating portion. The rotating portion includes a mirror portion whose outside surface includes a plurality of mirror surfaces that face radially outward. The mirror portion includes a rotation detection surface opposite to the detection sensor, and a balance correction portion defined by a groove or a projection extending in a circumferential direction in the rotation detection surface. The balance correction portion locates a center of gravity of the mirror portion closer to the rotation axis. The rotation of the rotating portion causes the balance correction portion to pass through a region to which light is emitted from the detection sensor.

20 Claims, 6 Drawing Sheets

MIRROR ROTATING APPARATUS

BACKGROUND OF THE INVENTION

1. Field of the Invention

The present invention relates to a mirror rotating apparatus.

2. Description of the Related Art

A polygon mirror is often used as a laser scanning component in a printer, a digital copy machine, or the like. JP-A 10-325937 discloses a polygon mirror including a triangular top surface and three mirror surfaces around the top surface, and a polygon mirror including a quadrilateral top surface and four mirror surfaces around the top surface. In each of these polygon mirrors, an inclination angle of each mirror surface, i.e., an angle defined between the mirror surface and the top surface, is different. A technique described in JP-A 10-325937 prevents a runout of the polygon mirror by adding an additional partial shape to the polygon mirror when producing the polygon mirror by an injection molding process so as to reduce the degree of eccentricity of the center of gravity of the polygon mirror with respect to an axis of a rotating shaft of the polygon mirror. Meanwhile, JP-A 2002-218721 discloses a technique of adding cuts to a rotor housing for a light deflector to achieve balance correction. The balance correction of the light deflector leads to reductions in vibrations and noise which occur while the light deflector is rotating at a high speed.

Meanwhile, in a scanner motor for use in a video tape recorder as described in JP-A 5-49225, an outer circumferential portion of a rotor yoke includes a flange portion arranged to project radially outward. The flange portion is made of a transparent material, and a large number of detected portions in a color which easily reflects light are arranged on a lower surface of the flange portion by a printing process. In the scanner motor for use in the video tape recorder, a light emitting element included in a reflective photoreflector is arranged to emit light to the detected portions, and a light receiving element is arranged to receive the light reflected from the detected portions, so that a rotational position signal of the motor is generated. In addition, a rotational position of a motor may be detected by a magnet provided in a rotating portion and a magnetic sensor provided in a stationary portion.

In a case where the detected portions are provided by the printing process in a mirror rotating apparatus arranged to rotate a mirror portion including a plurality of mirror surfaces as in the case of the scanner motor described in JP-A 5-49225, an apparatus for performing the printing process and a step of performing the printing process are needed. This leads to an increase in a production cost of the mirror rotating apparatus. Meanwhile, in a case where the rotational position of the motor is detected by using the magnet, the magnet needs to be additionally prepared, and a step of fixing the magnet to the mirror portion is needed. Moreover, as a result of the magnet being fixed to the mirror portion, the center of gravity of the mirror portion may become displaced from a rotation axis, resulting in an increase in runout.

SUMMARY OF THE INVENTION

Preferred embodiments of the present invention reduce a production cost of a mirror rotating apparatus in which detection of rotation of a rotating portion is performed.

A mirror rotating apparatus according to a preferred embodiment of the present invention includes a stationary portion and a rotating portion configured to rotate about a rotation axis extending in a vertical direction with respect to the stationary portion. The stationary portion includes a stator and a detection sensor configured to detect rotation of the rotating portion. The rotating portion includes a rotor magnet arranged radially opposite the stator, and a mirror portion whose outside surface includes a plurality of mirror surfaces each of which is arranged to face radially outward. The mirror portion includes a rotation detection surface arranged opposite to the detection sensor, and a balance correction portion defined by a groove or a projection extending in a circumferential direction in the rotation detection surface. The balance correction portion is arranged to make a center of gravity of the mirror portion closer to the rotation axis when compared to a case where the balance correction portion is not provided. The detection sensor is configured to emit light toward the rotation detection surface and receive the light reflected from the rotation detection surface. The rotation of the rotating portion causes the balance correction portion to pass a region to which the light is emitted from the detection sensor.

In the mirror rotating apparatus according to the above preferred embodiment of the present invention, the balance correction portion is used to detect the rotation of the rotating portion, and thus a reduction in a production cost of the mirror rotating apparatus is achieved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
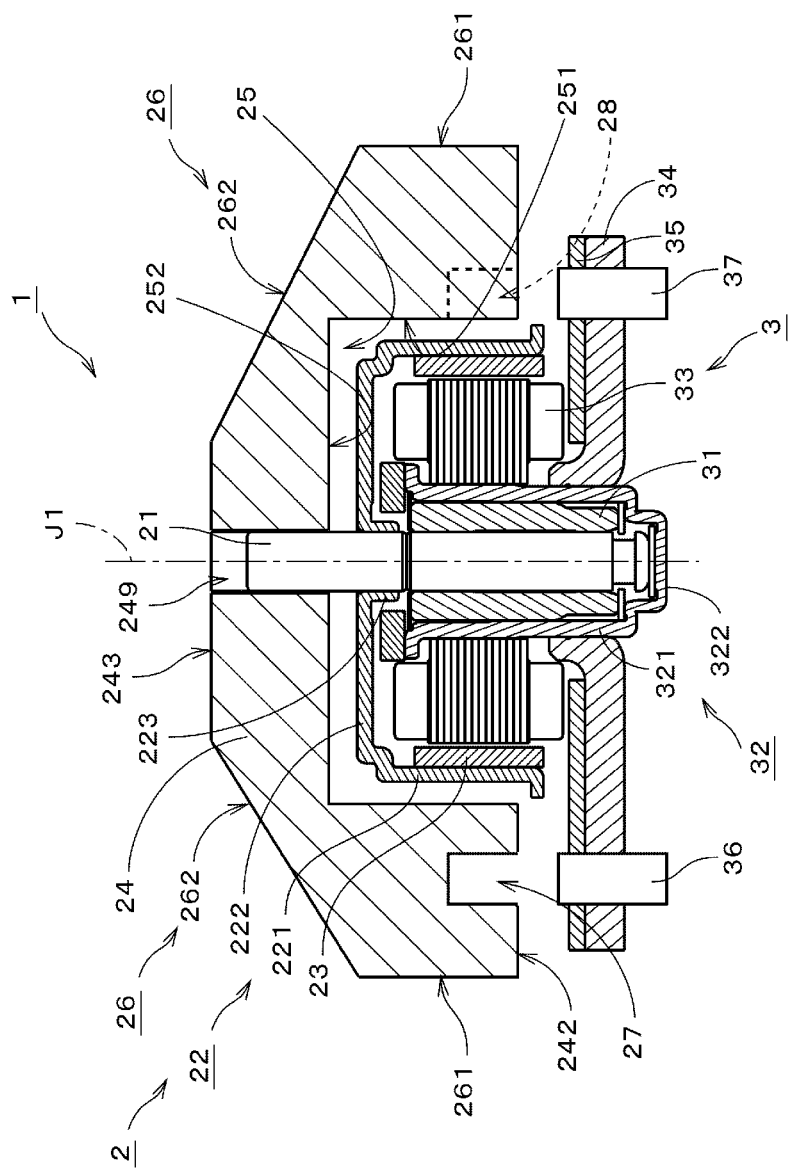
FIG. 1 is a vertical cross-sectional view of a mirror rotating apparatus according to a first preferred embodiment of the present invention.

It is assumed herein that a vertical direction is defined as a direction in which a rotation axis of a mirror rotating apparatus extends, and that an upper side and a lower side along the rotation axis in FIG. 1 are referred to simply as an upper side and a lower side, respectively. It should be noted, however, that the above definitions of the vertical direction and the upper and lower sides should not be construed to restrict relative positions or directions of different members or portions when the mirror rotating apparatus is actually installed in a device. Also note that a direction parallel or substantially parallel to the rotation axis is referred to by the term "axial direction", "axial", or "axially", that radial directions centered on the rotation axis are simply referred to by the term "radial direction", "radial", or "radially", and that a circumferential direction about the rotation axis is simply referred to by the term "circumferential direction", "circumferential", or "circumferentially".

First Preferred Embodiment

FIG. 1 is a vertical cross-sectional view of a mirror rotating apparatus 1 according to a first preferred embodiment of the present invention. The mirror rotating apparatus 1 includes a rotating portion 2 and a stationary portion 3. The rotating portion 2 is arranged to rotate about a rotation axis J1. The stationary portion 3 is arranged to rotatably support the rotating portion 2.

The rotating portion 2 preferably includes a columnar or substantially columnar shaft 21, a rotor holder 22 substantially in the shape of a covered cylinder, an annular rotor magnet 23, and a mirror portion 24. The shaft 21 is arranged to have the rotation axis J1, which extends in the vertical direction, as a center thereof. The rotor holder 22 is fixed to the shaft 21, and is arranged to rotate about the rotation axis J1. The mirror portion 24 is fixed to an upper end portion of the shaft 21.

The rotor holder 22 preferably includes an outer cylindrical portion 221, a cover portion 222, and an inner cylindrical portion 223. An outer circumferential surface of the rotor magnet 23 is fixed to an inner circumferential surface of the outer cylindrical portion 221. The cover portion 222 is preferably a flat plate extending from the outer cylindrical portion 221 toward the rotation axis J1. The inner cylindrical portion 223 extends axially downward from an inner edge of the cover portion 222. An inner circumferential surface of the inner cylindrical portion 223 is fixed to an outer circumferential surface of the shaft 21. Note that the rotor holder 22 may not necessarily be directly fixed to the shaft 21, but may instead be indirectly fixed to the shaft 21, for example, with another member fixed to the shaft 21 intervening therebetween.

The stationary portion 3 preferably includes a cylindrical or substantially cylindrical sleeve 31, a housing 32, a stator 33, a mounting plate 34 in or substantially in the shape of a flat plate, a circuit board 35, a first detection sensor 36, and a second detection sensor 37. An inner circumferential surface of the sleeve 31, which is a bearing mechanism, is arranged to support a lower end portion of the shaft 21, i.e., one end portion of the shaft 21, such that the shaft 21 is rotatable about the rotation axis J1. The sleeve 31 is preferably made of a sintered material, for example. The housing 32 preferably includes a cylindrical portion 321 and a bottom portion 322. An inner circumferential surface of the cylindrical portion 321 is arranged to hold an outer circumferential surface of the sleeve 31. The bottom portion 322 is arranged to close a bottom portion of the cylindrical portion 321. An inner circumferential surface of the stator 33 is fixed to an outer circumferential surface of the cylindrical portion 321 of the housing 32. The stator 33 is arranged radially inside the rotor magnet 23. An outer circumferential surface of the stator 33 is arranged radially opposite an inner circumferential surface of the rotor magnet 23. As described above, a so-called outer-rotor motor is constructed in the mirror rotating apparatus 1. Note that a so-called inner-rotor motor may alternatively be constructed in the mirror rotating apparatus 1 if so desired.

The mounting plate 34 is arranged axially below the stator 33. The mounting plate 34 includes an inner circumferential surface fixed to the outer circumferential surface of the cylindrical portion 321 of the housing 32. The circuit board 35 is arranged on an upper surface of the mounting plate 34. Each of the first detection sensor 36 and the second detection sensor 37 is preferably inserted in through holes defined in the mounting plate 34 and the circuit board 35, and is fixed to both the mounting plate 34 and the circuit board 35. Depending a shape of the mirror rotating apparatus 1, each of the first detection sensor 36 and the second detection sensor 37 may alternatively be fixed to an upper surface of the circuit board 35.

The first detection sensor 36 is preferably arranged radially outward of the rotor holder 22, and is arranged opposite to a lower surface 242 of the mirror portion 24. The first detection sensor 36 is configured to emit light toward the lower surface 242 and receive the light reflected from the lower surface 242. The second detection sensor 37 is also preferably arranged radially outward of the rotor holder 22, and is arranged opposite to the lower surface 242 of the mirror portion 24. Similar to the first detection sensor 36, the second detection sensor 37 is configured to emit light toward the lower surface 242 and receive the light reflected from the lower surface 242. Each of the first detection sensor 36 and the second detection sensor 37 is configured to detect a change in intensity of the reflected light, that is, a change in reflectivity in a region to which the light is emitted.

Once a current is supplied from an external power supply (not shown) to the stator 33, a magnetic field opposed to the rotor magnet 23 is generated around the stator 33. Magnetic interaction between this magnetic field and the rotor magnet 23 produces a force which drives the rotating portion 2 to rotate about the rotation axis J1. At this time, as described below, rotation of the mirror portion 24 is detected by the first detection sensor 36 and the second detection sensor 37 which emit the light toward the lower surface 242. Thus, the lower surface 242 of the mirror portion 24 defines a rotation detection surface.

Figure 2:
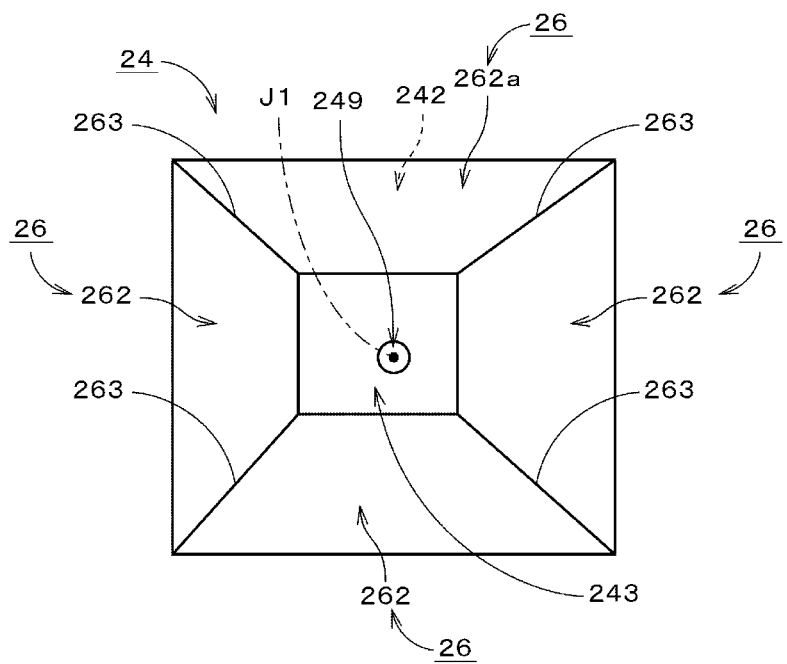
FIG. 2 is a plan view of a mirror portion according to the first preferred embodiment of the present invention.

FIG. 2 is a plan view of the mirror portion 24. Referring to FIG. 1, the mirror portion 24 includes the lower surface 242, which is arranged to extend perpendicularly or substantially perpendicularly to the axial direction, an upper surface 243 parallel or substantially parallel to the lower surface 242, and a through hole 249 centered on the rotation axis J1. The upper end portion of the shaft 21, which projects upward from the rotor holder 22 toward the mirror portion 24, is preferably press fitted, for example, into the through hole 249 to be fixed to the mirror portion 24. Note that the shaft 21 may be fixed to the mirror portion 24 through other methods such as, adhesion, ultrasonic welding, etc.

As illustrated in FIG. 2, the lower surface 242 is preferably arranged to have a rectangular or substantially rectangular external shape with the rotation axis J1 as a center, when viewed along the rotation axis J1, that is, in a plan view. In the plan view, the external shape of the upper surface 243 is rectangular, and the entire upper surface 243 is included in the lower surface 242. Each of four sides of the rectangular or substantially rectangular upper surface 243 is preferably parallel or substantially parallel to a corresponding one of four sides of the rectangular lower surface 242. A center of the upper surface 243 is spaced away from the rotation axis J1.

The mirror portion 24 includes four outside surfaces 26 each of which is arranged to face radially outward. Referring to FIG. 1, each outside surface 26 preferably includes a lower side surface 261 and an upper side surface 262. The lower side surface 261 preferably is a rectangular or substantially rectangular flat surface extending upward from one side of the lower surface 242 in parallel or substantially in parallel with the rotation axis J1. Each of the four lower side surfaces 261 extending from the respective four sides of the lower surface 242 is preferably arranged to have the same axial dimension. The upper side surface 262 is a flat surface extending from an upper side of the lower side surface 261 obliquely with respect to the rotation axis J1, and is joined to one side of the upper surface 243. As illustrated in FIG. 2, each of the four upper side surfaces 262 is joined to a separate one of the four sides of the upper surface 243. In FIG. 2, one of the upper side surfaces 262 is denoted by reference symbol "262a". As described above, the mirror portion 24 includes a portion in or substantially in the shape of a quadrangular prism and surrounded by the four lower side surfaces 261, and a portion in or substantially in the shape of a prismoid and surrounded by the four upper side surfaces 262. Each upper side surface 262 is subjected to a predetermined mirror finishing process. Hereinafter, each upper side surface 262 will be referred to as a "mirror surface" 262. Note that the upper surface 243 may alternatively be in the shape of a polygon other than a quadrilateral. In this case, a plurality of mirror surfaces 262 are joined to all sides of the polygon, respectively.

Every two circumferentially adjacent mirror surfaces 262 have a boundary portion 263 therebetween. Each boundary portion 263 of the mirror portion 24 illustrated in FIG. 2 is a side shared by the two circumferentially adjacent mirror surfaces 262. Note that the boundary portion 263 may be a line-shaped surface having a uniform width and arranged between the two adjacent mirror surfaces 262. Such a surface may preferably be obtained, for example, by performing a chamfering process on a corner portion between the two mirror surfaces 262.

In the mirror portion 24 illustrated in FIG. 2, the center of the upper surface 243 is spaced away from the rotation axis J1, that is, the center of the lower surface 242, by different distances in two directions along two sides of the rectangular upper surface 243 perpendicular or substantially perpendicular to each other. Accordingly, assuming that an angle at which each mirror surface 262 is inclined with respect to the rotation axis J1 is defined as a surface inclination angle, the surface inclination angle of each of the mirror surfaces 262 is preferably different. In practice, the surface inclination angle of the mirror surface 262 becomes smaller as the distance between the two parallel sides of the mirror surface 262, that is, the sides which are not the boundary portions 263, as measured in a direction perpendicular to the rotation axis J1 becomes shorter. In the mirror portion 24 illustrated in FIG. 2, the mirror surface 262a on an upper side in FIG. 2 has the smallest surface inclination angle, and the mirror surface 262 on a left-hand side, the mirror surface 262 on a lower side, and the mirror surface 262 on a right-hand side in FIG. 2 have progressively greater surface inclination angles in the order named. In addition, each of the mirror surfaces 262 preferably has a different shape when viewed along a normal to the mirror surface 262.

Figure 3:
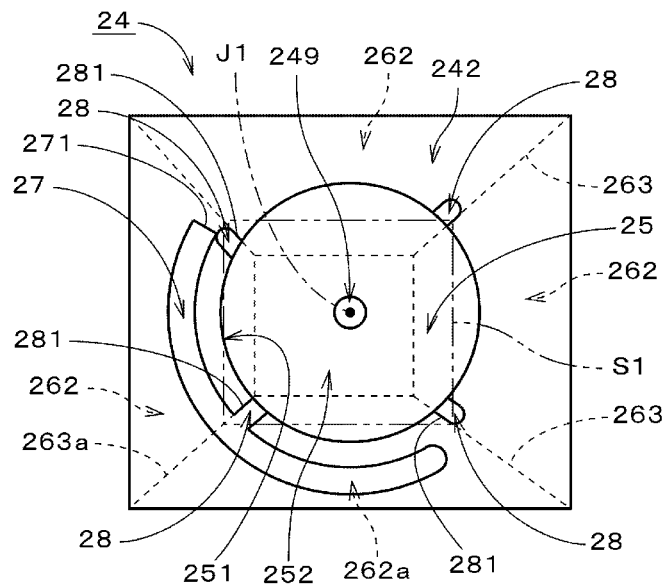
FIG. 3 is a bottom view of the mirror portion according to the first preferred embodiment of the present invention.

FIG. 3 is a bottom view of the mirror portion 24. The lower surface 242 of the mirror portion 24 preferably includes a recessed portion 25, one groove 27 arranged to extend in a circumferential direction, and a plurality of auxiliary grooves 28. The lower surface 242 is subjected to the mirror finishing process, and light reflectivity is high in a region excluding the recessed portion 25, the groove 27, and the auxiliary grooves 28. Referring to FIG. 1, the recessed portion 25 preferably includes a cylindrical inner circumferential surface 251 centered on the rotation axis J1, and a top surface 252 perpendicular to the rotation axis J1. The inner circumferential surface 251 is arranged radially opposite the outer cylindrical portion 221. The top surface 252 is arranged axially opposite the cover portion 222.

Referring to FIG. 3, an edge 271 of the groove 27 at one circumferential end is straight, and extends in a radial direction centered on the rotation axis J1. The mirror portion is configured to rotate in a clockwise direction about the rotation axis J1 in FIG. 3. The edge 271 is a forward edge of the groove 27 with respect to a rotation direction of the mirror portion 24. The groove 27 is preferably arranged to overlap with the mirror surface 262a having the smallest surface inclination angle in a plan view. In addition, the groove 27 is also preferably arranged to overlap with the mirror surface 262 having the second smallest surface inclination angle, that is, the mirror surface 262 on a left-hand side in FIG. 3.

Here, a predetermined cross section of the mirror portion 24 perpendicular to the rotation axis J1 and taken above the lower side surface 261 is defined as a cross section S1. In FIG. 3, the external shape of the cross section S1 is represented by a rectangle drawn in a chain double-dashed line denoted by reference symbol "S1". The distance between the rotation axis J1 and the boundary portion 263 between each pair of two circumferentially adjacent mirror surfaces 262 of the plurality of mirror surfaces 262 is defined as a "boundary-axis distance". In the cross section S1, the boundary-axis distance is different with respect to each boundary portion 263.

If the groove 27 were not provided, the center of gravity of the mirror portion 24 would be spaced away from the rotation axis J1 toward the mirror surface 262a having the smallest surface inclination angle and the mirror surface 262 having the second smallest surface inclination angle. In other words, in the cross section S1, the center of gravity of the mirror portion 24 would be displaced toward the boundary portion 263a with respect to which the boundary-axis distance is the greatest. Hereinafter, the boundary portion 263a with respect to which the boundary-axis distance is the greatest will be referred to also as a "farthest boundary portion" 263a. In the actual mirror portion 24, the groove 27 is arranged on a side of the rotation axis J1 closer to the farthest boundary portion 263a. Provision of the groove 27 moves the center of gravity of the mirror portion 24 closer to the rotation axis J1 when compared to a case where the groove 27 is not provided. As described above, the groove 27 in the mirror portion 24 illustrated in FIG. 3 serves as a balance correction portion to move the center of gravity of the mirror portion 24 closer to the rotation axis J1. From the viewpoint of balance correction, at least a portion of the groove 27 is preferably arranged in a region in the lower surface 242, the region extending in each circumferential direction by an angular range of about 90 degrees from a line which joins the rotation axis J1 and the farthest boundary portion 263a in the cross section S1. The groove 27 is defined, for example, by a cutting process.

The auxiliary grooves 28 are arranged in the circumferential direction in the lower surface 242 such that each auxiliary groove 28 is arranged at a radial position different from that of the groove 27. The number of auxiliary grooves 28 included in the mirror portion 24 is equal to the number of mirror surfaces 262. Each of the auxiliary grooves 28 is preferably defined, for example, by a cutting process. Each auxiliary groove 28 is arranged to overlap with one of the boundary portions 263 in a plan view. In more detail, each auxiliary groove 28 includes two straight edges each of which is arranged to extend along the boundary portion 263 in the plan view. Of the two straight edges, an edge 281 of the auxiliary groove 28 which is forward with respect to the rotation direction of the mirror portion 24 is arranged to axially overlap with the boundary portion 263. One of the auxiliary grooves 28 is continuous with the groove 27. The auxiliary grooves 28 are preferably arranged evenly or substantially evenly in the circumferential direction, and therefore, provision of the auxiliary grooves 28 does not cause a significant movement of the center of gravity of the mirror portion 24. In the mirror portion 24 according to a preferred embodiment of the present invention, the center of gravity of the mirror portion 24 lies on or substantially on the rotation axis J1, with the groove 27 and the auxiliary grooves 28 defined in the mirror portion 24.

Figure 4:
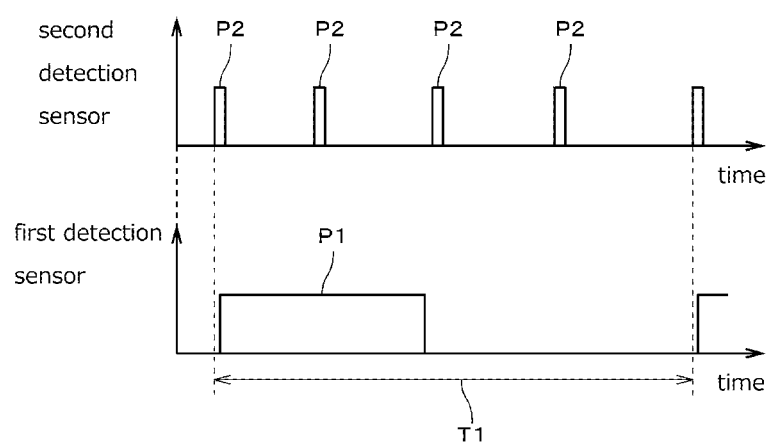
FIG. 4 is a diagram illustrating pulses outputted from detection sensors according to the first preferred embodiment of the present invention.

Referring to FIG. 1, in the mirror rotating apparatus 1, the groove 27 is arranged at the same radial position as that of the first detection sensor 36. Therefore, rotation of the rotating portion 2 causes the groove 27 to pass a region on the lower surface 242 to which the light is emitted from the first detection sensor 36. Accordingly, as illustrated in a lower portion of FIG. 4, one pulse P1 is outputted from the first detection sensor 36 in a period T1 during which the rotating portion 2 rotates one time. The pulse P1 occurs only in a partial angular range in the circumferential direction, and can therefore be said to be uneven in the circumferential direction.

In addition, each of the auxiliary grooves 28 is arranged at the same radial position as that of the second detection sensor 37. Therefore, the rotation of the rotating portion 2 causes the auxiliary grooves 28 to successively pass a region on the lower surface 242 to which the light is emitted from the second detection sensor 37. Accordingly, as illustrated in an upper portion of FIG. 4, four pulses P2 are outputted from the second detection sensor 37 in the period T1 during which the rotating portion 2 rotates one time. The circumferential angular position of each of the auxiliary grooves 28 with respect to a predetermined reference position on the lower surface 242 is previously known. Therefore, the pulse P2, which occurs for each auxiliary groove 28, indicates a rotation angle of the mirror portion 24. Thus, the auxiliary grooves 28 define and serve as a plurality of rotation angle indicating portions. In the mirror portion 24 illustrated in FIG. 3, each of the auxiliary grooves indicates the angular position of a separate one of the boundary portions 263. Accordingly, the pulse P2 obtained by the second detection sensor 37 indicates a change in the mirror surfaces 262 at the position of the second detection sensor 37.

As described above, in the mirror rotating apparatus 1, one rotation of the rotating portion 2 is detected as a result of the groove 27, which defines and serves as the balance correction portion as well, passing the region to which the light is emitted from the first detection sensor 36. Thus, by using the groove 27, which is also used for the purpose of balance correction, to detect the rotation of the rotating portion 2, a reduction in the number of parts of the mirror rotating apparatus 1 is achieved compared to a case where another member, such as, for example, a magnet, is attached to the lower surface 242 as a portion to be detected. Moreover, a reduction in the number of steps in a process of manufacturing the mirror rotating apparatus 1 is also achieved compared to the case where the other member is attached to the lower surface 242 as the portion to be detected, or the case where, for example, a predetermined pattern is printed on the lower surface 242. This leads to a reduction in a production cost of the mirror rotating apparatus 1. Further, the auxiliary grooves 28 and the second detection sensor 37 are preferably provided in the mirror rotating apparatus 1. The changes in the mirror surfaces 262 are easily detected by the auxiliary grooves 28 successively passing the region to which the light is emitted from the second detection sensor 37.

In the mirror rotating apparatus 1 illustrated in FIG. 1, the mirror portion 24 is fixed to the shaft 21, and this makes it easy for a center of the rotation of the mirror portion 24 to coincide with that of the shaft 21, that is, to improve concentricity of the mirror portion 24 with the rotation axis J1. In addition, most of the rotor holder 22 is arranged inside the recessed portion 25 of the mirror portion 24, which opens toward the rotor holder 22. This leads to a reduction in the thickness of the mirror rotating apparatus 1.

Figure 5:
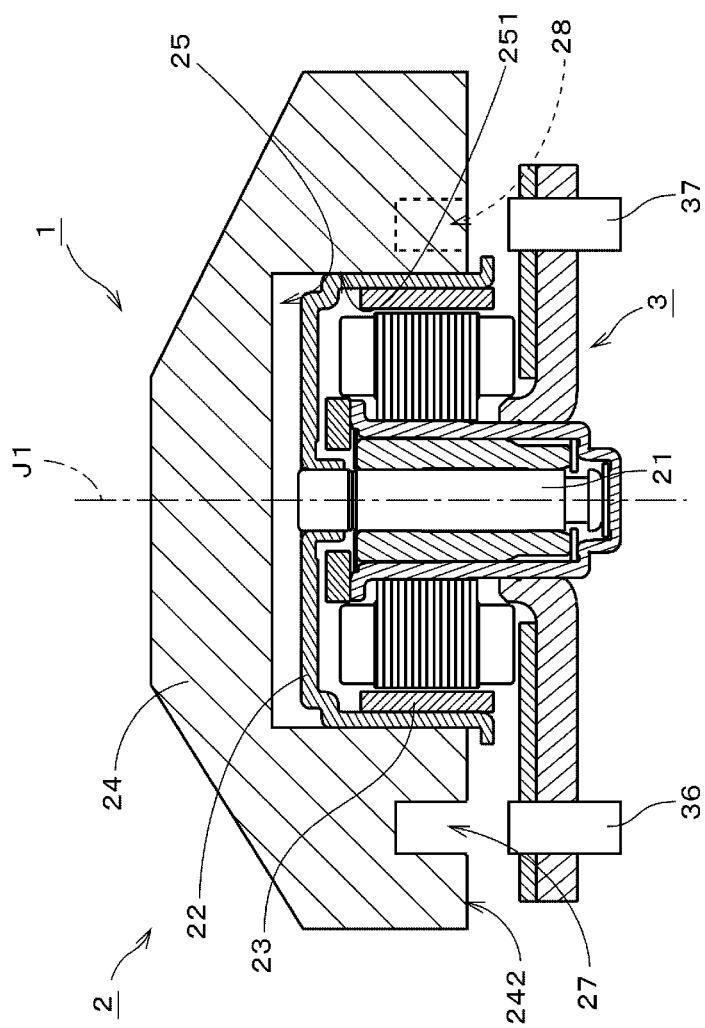
FIG. 5 is a vertical cross-sectional view of a mirror rotating apparatus according to a modification of the first preferred embodiment of the present invention.

Referring to FIG. 5, according to a modification of the first preferred embodiment, an outer circumferential surface of a rotor holder 22 preferably is fixed to an inner circumferential surface 251 of a recessed portion 25 of a mirror portion 24. In this case, the mirror portion 24 is securely fixed to the rotor holder 22 over a large area of the inner circumferential surface 251 of the recessed portion 25. As a result, a reduction in vibrations of the mirror portion 24 is achieved. In a modification of a mirror rotating apparatus 1a, which will be described below, an outer circumferential surface of a rotor holder 22 preferably is fixed to an inner circumferential surface 251 of a recessed portion 25 of a mirror portion 24.

Second Preferred Embodiment

Figure 6:
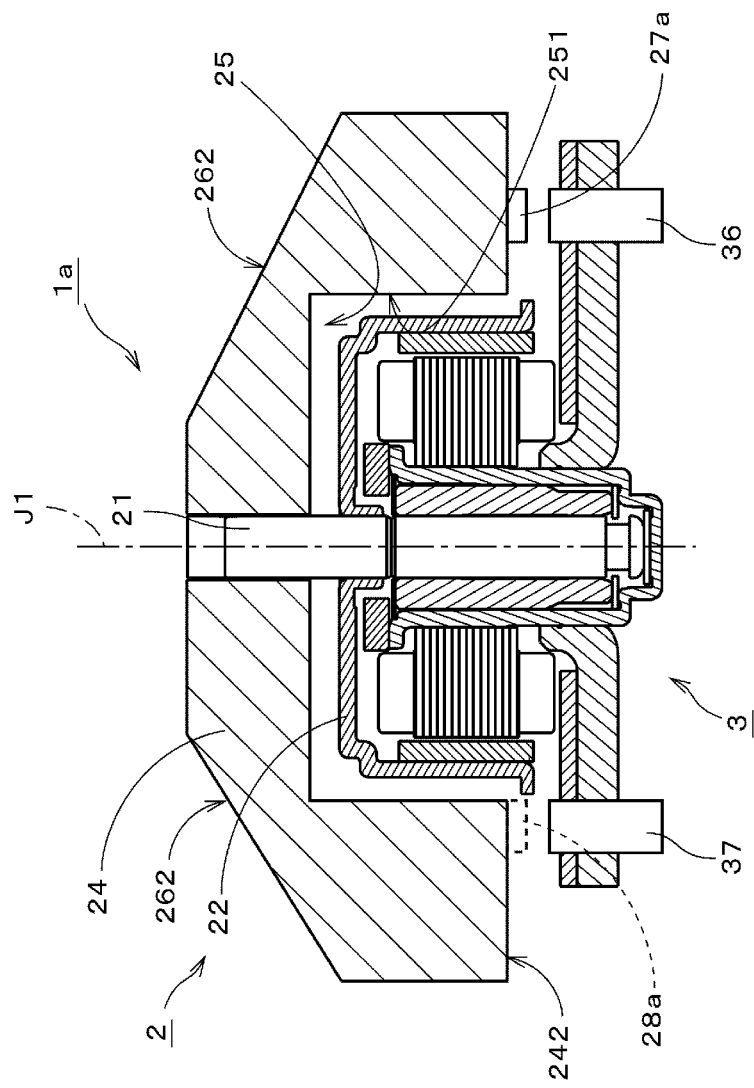
FIG. 6 is a vertical cross-sectional view of a mirror rotating apparatus according to a second preferred embodiment of the present invention.

FIG. 6 is a vertical cross-sectional view of the mirror rotating apparatus 1a according to a second preferred embodiment of the present invention. The mirror rotating apparatus 1a illustrated in FIG. 6 is different from the mirror rotating apparatus 1 illustrated in FIG. 1 in that one projection 27a and a plurality of auxiliary projections 28a are preferably provided in place of the groove 27 and the auxiliary grooves 28, respectively. The mirror rotating apparatus 1a illustrated in FIG. 6 is preferably otherwise similar in structure to the mirror rotating apparatus 1 illustrated in FIG. 1. Accordingly, like members or portions are designated by like reference numerals, and redundant description is omitted.

Figure 7:
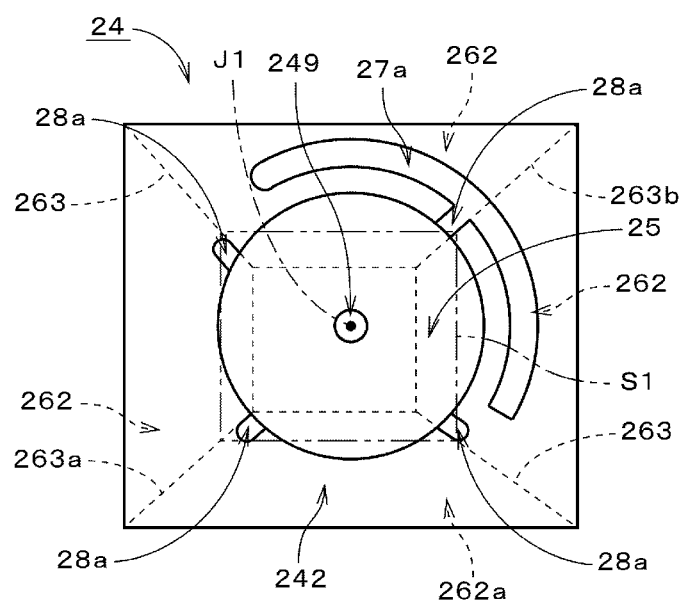
FIG. 7 is a bottom view of a mirror portion according to the second preferred embodiment of the present invention.

FIG. 7 is a bottom view of the mirror portion 24. The one projection 27a, which is arranged to extend in the circumferential direction, and the plurality of auxiliary projections 28a are provided in a lower surface 242 of a mirror portion 24. Each of the projection 27a and the auxiliary projections 28a is arranged to project downward from the lower surface 242. The projection 27a is arranged to overlap with a mirror surface 262 having the greatest surface inclination angle, that is, the mirror surface 262 on a right-hand side in FIG. 7, in a plan view. In addition, the projection 27a is arranged to overlap also with a mirror surface 262 having the second greatest surface inclination angle, that is, the mirror surface 262 on an upper side in FIG. 7.

Here, as with the case of FIG. 3, a predetermined cross section of the mirror portion 24 perpendicular to a rotation axis J1 is defined as a cross section S1. If the projection 27a were not provided, the center of gravity of the mirror portion 24 would be displaced toward a boundary portion 263a with respect to which the boundary-axis distance is the greatest in the cross section S1. Accordingly, in the mirror portion 24 illustrated in FIG. 7, the projection 27a is provided on an opposite side of the rotation axis J1 with respect to the above boundary portion 263a. Hereinafter, a boundary portion 263b with respect to which the boundary-axis distance is the smallest will be referred to as a "closest boundary portion" 263b. The projection 27a is preferably arranged on a side of the rotation axis J1 closer to the closest boundary portion 263b. Provision of the projection 27a moves the center of gravity of the mirror portion 24 closer to the rotation axis J1 when compared to the case where the projection 27a is not provided. As described above, the projection 27a in the mirror portion 24 illustrated in FIG. 7 serves as a balance correction portion to move the center of gravity of the mirror portion 24 closer to the rotation axis J1. From the viewpoint of balance correction, at least a portion of the projection 27a is preferably arranged in a region in the lower surface 242, the region extending in each circumferential direction by an angular range of about 90 degrees from a line which joins the rotation axis J1 and the closest boundary portion 263b in the cross section S1. The auxiliary projections 28a are arranged at the same positions as those of the auxiliary grooves 28 illustrated in FIG. 3. Moreover, each of the auxiliary projections 28a preferably have the same shape as that of each of the auxiliary grooves 28 illustrated in FIG. 3 in a plan view.

Referring to FIG. 6, the projection 27a is preferably arranged at the same radial position as that of a first detection sensor 36. Therefore, rotation of a rotating portion 2 causes the projection 27a to pass a region on the lower surface 242 to which light is emitted from the first detection sensor 36. Accordingly, one pulse is outputted from the first detection sensor 36 in a period during which the rotating portion 2 rotates one time. In addition, each of the auxiliary projections 28a is preferably arranged at the same radial position as that of a second detection sensor 37. Therefore, the rotation of the rotating portion 2 causes the auxiliary projections 28a to successively pass a region on the lower surface 242 to which light is emitted from the second detection sensor 37. Accordingly, four pulses are outputted from the second detection sensor 37 in the period during which the rotating portion 2 rotates one time. Similar to each of the auxiliary grooves 28 illustrated in FIG. 3, each of the auxiliary projections 28a also serves as a rotation angle indicating portion.

As described above, in the mirror rotating apparatus 1a, one rotation of the rotating portion 2 is detected as a result of the projection 27a, which also serves as the balance correction portion, passing the region to which the light is emitted from the first detection sensor 36. Thus, by using the projection 27a, which is also used for the purpose of balance correction, to detect the rotation of the rotating portion 2, a reduction in the number of parts of the mirror rotating apparatus 1a is achieved, and a reduction in a production cost of the mirror rotating apparatus 1a is achieved. Further, the auxiliary projections 28a and the second detection sensor 37 are provided in the mirror rotating apparatus 1a. Changes in the mirror surfaces 262 are easily detected by the auxiliary projections 28a successively passing the region to which the light is emitted from the second detection sensor 37.

Note that the structure of each of the above-described mirror rotating apparatuses 1 and 1a may be modified in a variety of manners.

The above-described method of using the balance correction portion to detect the rotation of the rotating portion 2 is applicable to mirror portions 24 in a variety of shapes and the center of gravity of which is positioned away from the rotation axis J1 in the case where the balance correction portion is not provided therein. For example, in a mirror portion 24 in which an angle at which one of a plurality of mirror surface 262 is inclined with respect to the rotation axis J1 is different from an angle at which at least one of the other mirror surfaces 262 is inclined with respect to the rotation axis J1, the center of gravity of the mirror portion 24 tends to be located away from the rotation axis J1. In addition, also in a mirror portion 24 in which one of a plurality of mirror surfaces 262 is different in shape from at least one of the other mirror surfaces 262, the center of gravity of the mirror portion 24 tends to be spaced away from the rotation axis J1. Therefore, for these mirror portions 24, provision of the balance correction portion and use of the balance correction portion to detect the rotation of the rotating portion 2 are suitable.

In addition, the above-described method is also applicable to a mirror portion 24 each of whose mirror surfaces 262 has the same shape and the same surface inclination angle and in which a rotation axis J1 is displaced from a center of the mirror portion 24. Note that the external shape of each mirror portion 24 in a plan view may not necessarily be quadrilateral. Also note that the number of mirror surfaces 262 included in the mirror portion 24 may be three or more than four, if so desired.

Note that, in a modification of each of the mirror rotating apparatuses 1 and 1a, a plurality of grooves 27 or a plurality of projections 27a may also be defined in the mirror portion 24 depending on a mode of balance correction in the mirror rotating apparatus 1 or 1a. In this case, the plurality of grooves 27 or the plurality of projections 27a define and serve as a plurality of balance correction portions to move the center of gravity of the mirror portion 24 closer to the rotation axis J1 than in the case where the plurality of balance correction portions are not provided. Moreover, one rotation of the rotating portion 2 is detected by the first detection sensor based on a plurality of pulses due to the plurality of balance correction portions. Note that, from the viewpoint of easily detecting one rotation of the rotating portion 2 and a home position of the rotating portion 2 with the first detection sensor 36, it is preferable that the rotation of the rotating portion 2 should cause only one balance correction portion to pass the region to which the light is emitted from the first detection sensor 36.

Note that, depending on a shape of the mirror rotating apparatus, the balance correction portion(s) may alternatively be provided in the inner circumferential surface 251 of the recessed portion 25 or the lower side surface(s) 261 of the mirror portion 24, if so desired. In this case, the first detection sensor 36 is configured such that the first detection sensor 36 is capable of emitting light toward the inner circumferential surface 251 or the lower side surface(s) 261, i.e., the rotation detection surface, and receiving the light reflected therefrom. Also note that the rotation angle indicating portions may also be provided in the inner circumferential surface 251 of the recessed portion 25 or the lower side surfaces 261. In this case, the rotation angle indicating portions are arranged in the circumferential direction such that each of the rotation angle indicating portions is arranged at an axial position different from that of the balance correction portion(s).

Note that, in the mirror rotating apparatus 1 illustrated in FIG. 1, the plurality of auxiliary grooves 28 may be replaced with the plurality of auxiliary projections 28a. Also note that, in the mirror rotating apparatus 1a illustrated in FIG. 6, the plurality of auxiliary projections 28a may be replaced with the plurality of auxiliary grooves 28. Also note that, in each of the mirror rotating apparatuses 1 and 1a, both an auxiliary groove(s) 28 and an auxiliary projection(s) 28a may be provided, if so desired.

Here, in the predetermined cross section S1 of the mirror portion 24 perpendicular to the rotation axis J1, a line which joins the rotation axis J1 and the boundary portion 263 between each pair of two circumferentially adjacent mirror surfaces 262 of the plurality of mirror surfaces 262 is defined as a "boundary-axis imaginary line". In addition, each of the auxiliary grooves 28 and the auxiliary projections 28a is referred to as the "rotation angle indicating portion". In this case, regarding the mirror portion 24, it is preferable that a circumferential angle between the boundary-axis imaginary line for each of the plurality of boundary portions 263 and the rotation angle indicating portion adjacent, in a clockwise direction, to the boundary-axis imaginary line for the boundary portion 263 should be equal. This makes it possible to detect a change in the mirror surfaces 262 at a predetermined position. More preferably, as in each of the mirror rotating apparatuses 1 and 1a, in the lower surface 242 of the mirror portion 24, each of the plurality of rotation angle indicating portions is arranged on a separate one of the plurality of boundary-axis imaginary lines in a plan view. This makes it easy to detect a change in the mirror surfaces 262.

Note that the number of rotation angle indicating portions provided in the mirror portion 24 may be different from the number of mirror surfaces 262 of the mirror portion 24. For example, in a mirror portion 24 including four mirror surfaces 262, six rotation angle indicating portions may be arranged at equal or substantially equal angular intervals in the circumferential direction, if so desired. In this case, the rotation angle of the mirror portion 24 is detected based on the plurality of rotation angle indicating portions. Moreover, because angular positions at which changes in the mirror surfaces 262 occur are previously known, it is possible to indirectly detect the changes in the mirror surfaces 262.

From the viewpoint of reducing the thickness of each of the mirror rotating apparatuses 1 and 1a, it is preferable that at least a portion of the rotor holder 22 should be arranged inside the recessed portion 25. Moreover, it is also preferable that each of the balance correction portion(s) and the rotation angle indicating portions should be arranged at an axial level lower than an axial level of the cover portion 222 of the rotor holder 22, that is, on a side of the cover portion 222 of the rotor holder 22 closer to the one end portion of the shaft 21 at which the shaft 21 is supported by the stationary portion 3.

Note that features of the above-described preferred embodiments and the modifications thereof may be combined appropriately as long as no conflict arises.

Mirror rotating apparatuses according to preferred embodiments of the present invention can be used in a variety of applications.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A mirror rotating apparatus comprising:
   a stationary portion; and
   a rotating portion configured to rotate about a rotation axis extending in a vertical direction with respect to the stationary portion; wherein
   the stationary portion includes:
      a stator; and
      a detection sensor configured to detect rotation of the rotating portion;
   the rotating portion includes:
      a rotor magnet arranged radially opposite to the stator; and
      a mirror portion whose outside surface includes a plurality of mirror surfaces each of which is arranged to face radially outward;
   the mirror portion includes:
      a rotation detection surface arranged opposite to the detection sensor; and
      a balance correction portion defined by a groove or a projection extending in a circumferential direction in the rotation detection surface;
   the balance correction portion is arranged such that a center of gravity of the mirror portion is closer to the rotation axis as compared to a case where the balance correction portion is not provided;
   the detection sensor is configured to emit light toward the rotation detection surface and receive the light reflected from the rotation detection surface; and
   the rotation of the rotating portion causes the balance correction portion to pass a region to which the light is emitted from the detection sensor.

2. The mirror rotating apparatus according to claim 1, wherein
   the balance correction portion is defined by the groove; and
   assuming that a distance between the rotation axis and a boundary portion between each pair of two circumferentially adjacent mirror surfaces of the plurality of mirror surfaces is defined as a boundary-axis distance, at least a portion of the balance correction portion is located in a region in the rotation detection surface, the region extending in each circumferential direction by an angular range of about 90 degrees from a line joining the rotation axis and the boundary portion with respect to which the boundary-axis distance is greatest in a predetermined cross section of the mirror portion perpendicular or substantially perpendicular to the rotation axis.

3. The mirror rotating apparatus according to claim 2, wherein, in the predetermined cross section, the boundary-axis distance is different with respect to each boundary portion.

4. The mirror rotating apparatus according to claim 3, wherein each of the plurality of mirror surfaces includes a flat surface inclined with respect to the rotation axis.

5. The mirror rotating apparatus according to claim 4, wherein an angle at which one of the plurality of mirror surfaces is inclined with respect to the rotation axis is different from an angle at which at least one of the other mirror surfaces is inclined with respect to the rotation axis.

6. The mirror rotating apparatus according to claim 5, wherein at least one of the plurality of mirror surfaces has a shape different from a shape of at least one of the other mirror surfaces.

7. The mirror rotating apparatus according to claim 6, wherein the balance correction portion is one in number.

8. The mirror rotating apparatus according to claim 1, wherein
   the balance correction portion is defined by the projection; and
   assuming that a distance between the rotation axis and a boundary portion between each pair of two circumferentially adjacent mirror surfaces of the plurality of mirror surfaces is defined as a boundary-axis distance, at least a portion of the balance correction portion is located in a region in the rotation detection surface, the region extending in each circumferential direction by an angular range of about 90 degrees from a line joining the rotation axis and the boundary portion with respect to which the boundary-axis distance is smallest in a predetermined cross section of the mirror portion perpendicular or substantially perpendicular to the rotation axis.

9. The mirror rotating apparatus according to claim 8, wherein, in the predetermined cross section, the boundary-axis distance is different with respect to each boundary portion.

10. The mirror rotating apparatus according to claim 9, wherein each of the plurality of mirror surfaces includes a flat surface inclined with respect to the rotation axis.

11. The mirror rotating apparatus according to claim 10, wherein an angle at which one of the plurality of mirror surfaces is inclined with respect to the rotation axis is different from an angle at which at least one of the other mirror surfaces is inclined with respect to the rotation axis.

12. The mirror rotating apparatus according to claim 11, wherein at least one of the plurality of mirror surfaces has a shape different from a shape of at least one of the other mirror surfaces.

13. The mirror rotating apparatus according to claim 1, wherein
   the mirror portion further includes, as a plurality of rotation angle indicating portions, a plurality of auxiliary grooves arranged in a circumferential direction in the rotation detection surface, each auxiliary groove being arranged at a radial position different from a radial position of the balance correction portion or at an axial position different from an axial position of the balance correction portion;

the stationary portion further includes another detection sensor;

the another detection sensor is configured to emit light toward the rotation detection surface and receive the light reflected from the rotation detection surface; and the rotation of the rotating portion causes each of the plurality of rotation angle indicating portions to pass a region to which the light is emitted from the other detection sensor.

14. The mirror rotating apparatus according to claim 13, wherein, assuming that a line joining the rotation axis and a boundary portion between each pair of two circumferentially adjacent mirror surfaces of the plurality of mirror surfaces in a predetermined cross section of the mirror portion perpendicular or substantially perpendicular to the rotation axis is defined as a boundary-axis imaginary line, a circumferential angle between the boundary-axis imaginary line for each boundary portion and the rotation angle indicating portion adjacent, in a clockwise direction, to the boundary-axis imaginary line for the boundary portion in the predetermined cross section is equal.

15. The mirror rotating apparatus according to claim 14, wherein, in the rotation detection surface, each of the plurality of rotation angle indicating portions is arranged on a separate one of the boundary-axis imaginary lines in a plan view.

16. The mirror rotating apparatus according to claim 15, wherein
the rotating portion further includes:
a rotor holder which is in or substantially in a shape of a covered cylinder and to which the rotor magnet is fixed, the rotor holder including a cover portion; and
a shaft arranged to have the rotation axis as a center thereof, and fixed to the rotor holder;
the stationary portion is arranged to support one end portion of the shaft such that the shaft is rotatable;
an opposite end portion of the shaft projects from the rotor holder toward the mirror portion, and is fixed to the mirror portion; and
the detection sensor is arranged radially outward of the rotor holder.

17. The mirror rotating apparatus according to claim 16, wherein
the mirror portion includes a recessed portion arranged to be open toward the rotor holder; and
the rotor magnet is fixed to an inner circumferential surface of the rotor holder and is arranged radially opposite to the stator, and at least a portion of the rotor holder is arranged inside the recessed portion.

18. The mirror rotating apparatus according to claim 17, wherein the balance correction portion is arranged on a side of the cover portion of the rotor holder closer to the one end portion of the shaft.

19. The mirror rotating apparatus according to claim 15, wherein
the rotating portion further includes:
a rotor holder in or substantially in a shape of a covered cylinder, and including an inner circumferential surface to which the rotor magnet is fixed, the rotor holder including a cover portion; and
a shaft arranged to have the rotation axis as a center thereof, and fixed to the rotor holder;
the stationary portion is arranged to support one end portion of the shaft such that the shaft is rotatable;
the mirror portion includes a recessed portion arranged to be open toward the rotor holder;
an outer circumferential surface of the rotor holder is fixed to an inner circumferential surface of the recessed portion; and
the detection sensor is arranged radially outward of the rotor holder.

20. The mirror rotating apparatus according to claim 19, wherein the balance correction portion is arranged on a side of the cover portion of the rotor holder closer to the one end portion of the shaft.

* * * * *